Sept. 29, 1925.
C. J. WRIGHT
GAS FURNACE
Filed Sept. 5, 1919
1,555,780
4 Sheets-Sheet 4
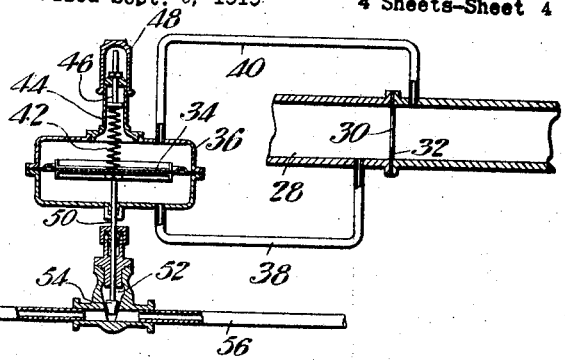
Fig. 4.
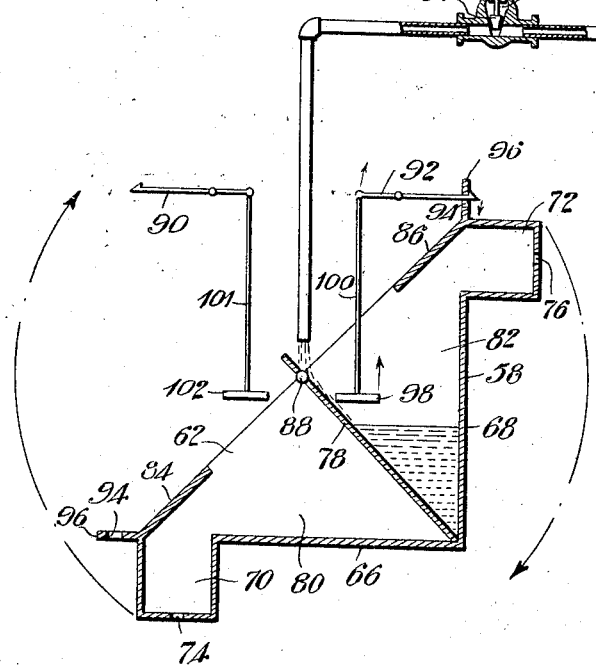
Fig. 6.
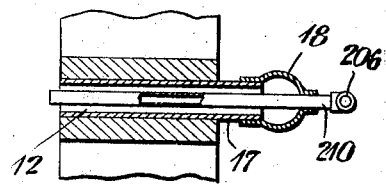
Fig. 5.
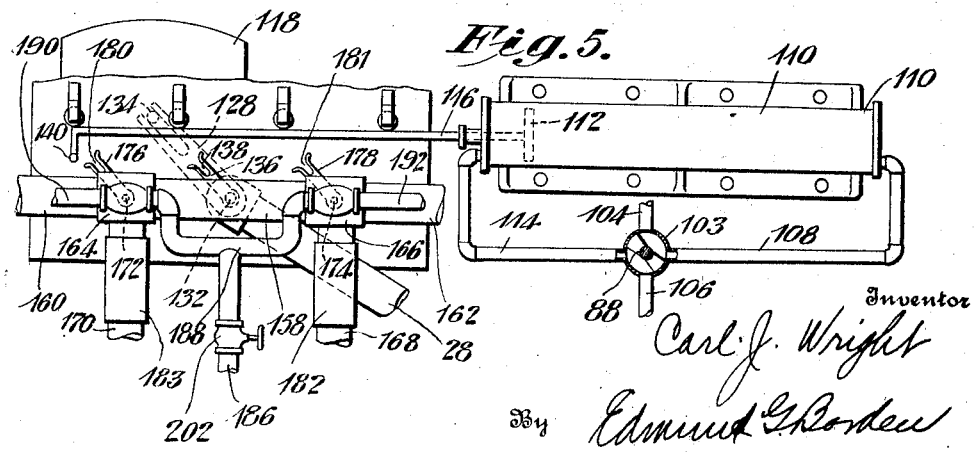
Inventor
Carl J. Wright
By Edmund G. Borden
Attorney Patented Sept. 29, 1925.

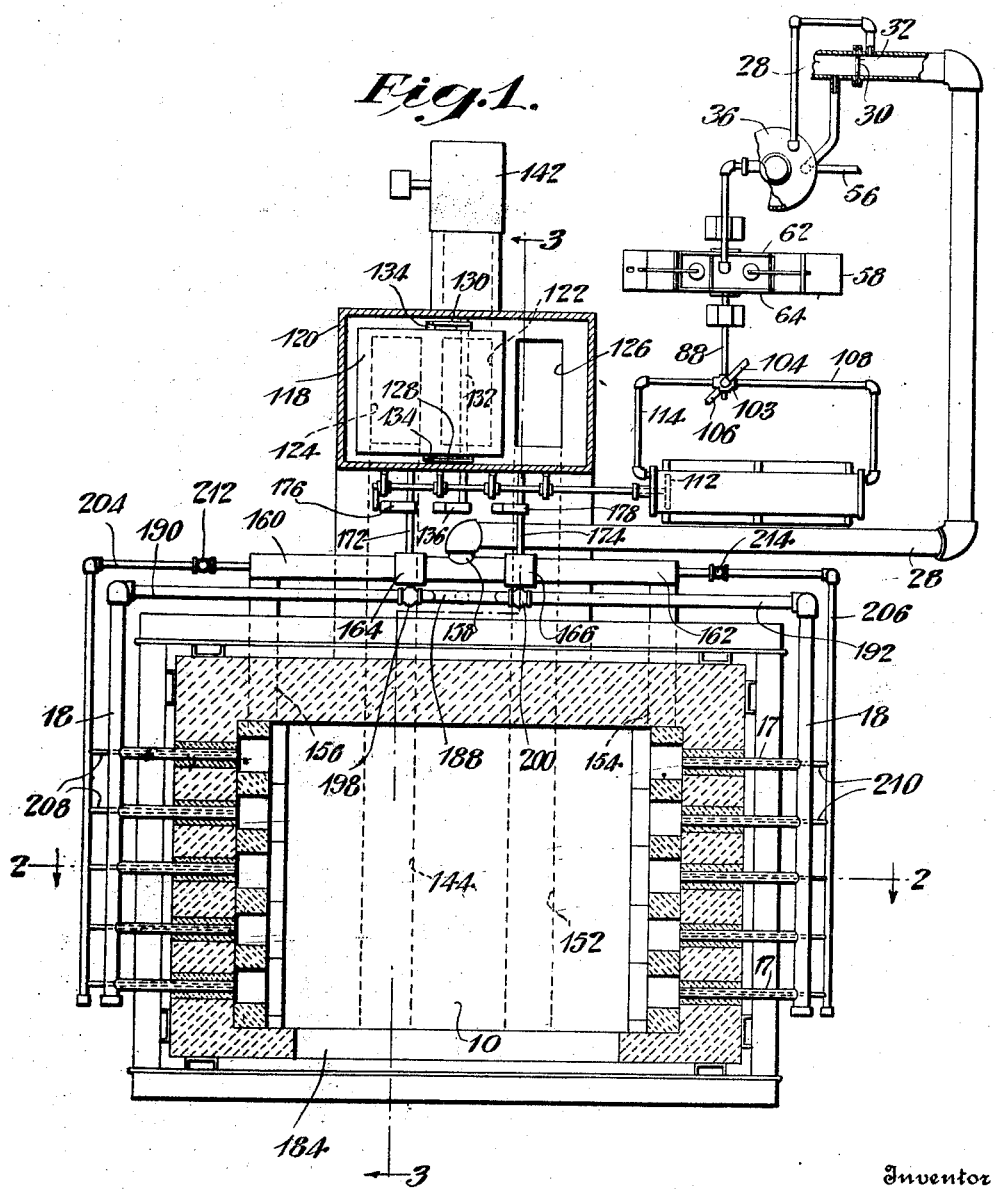

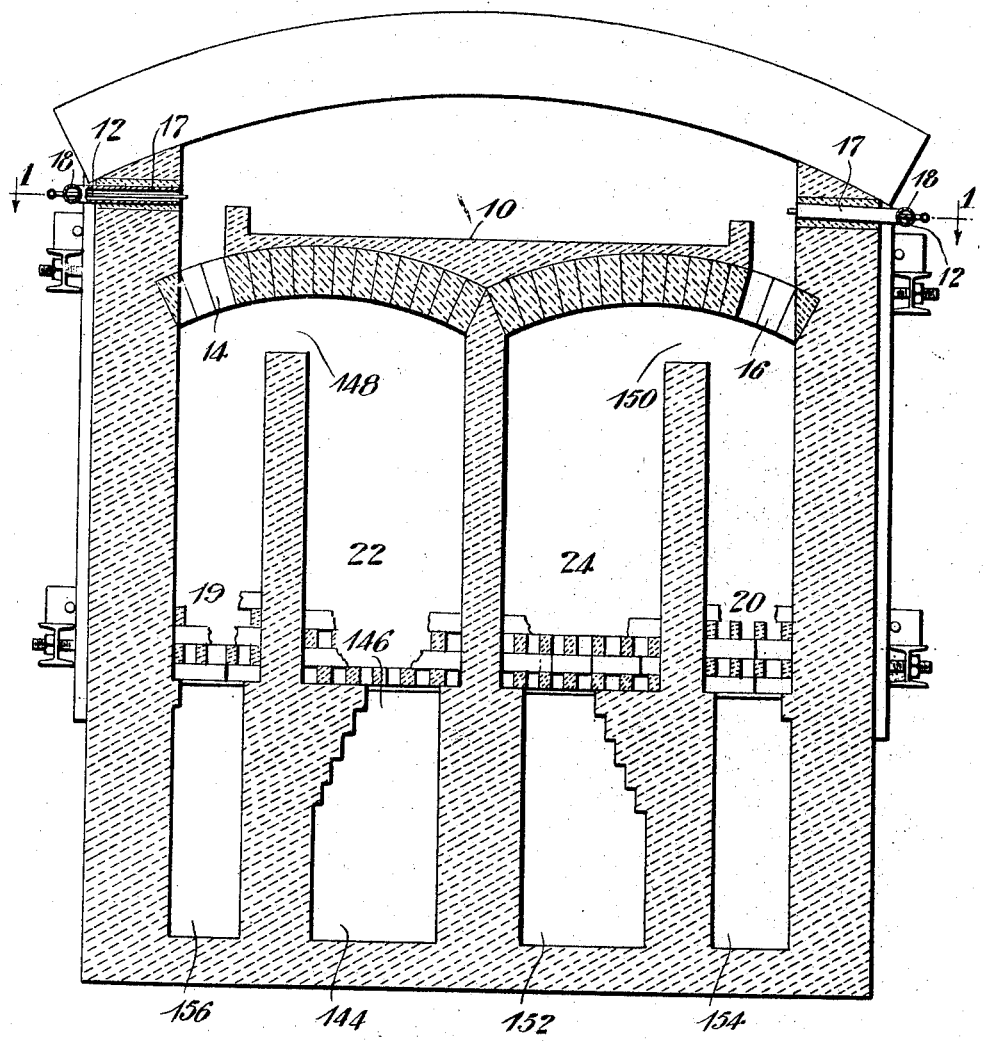

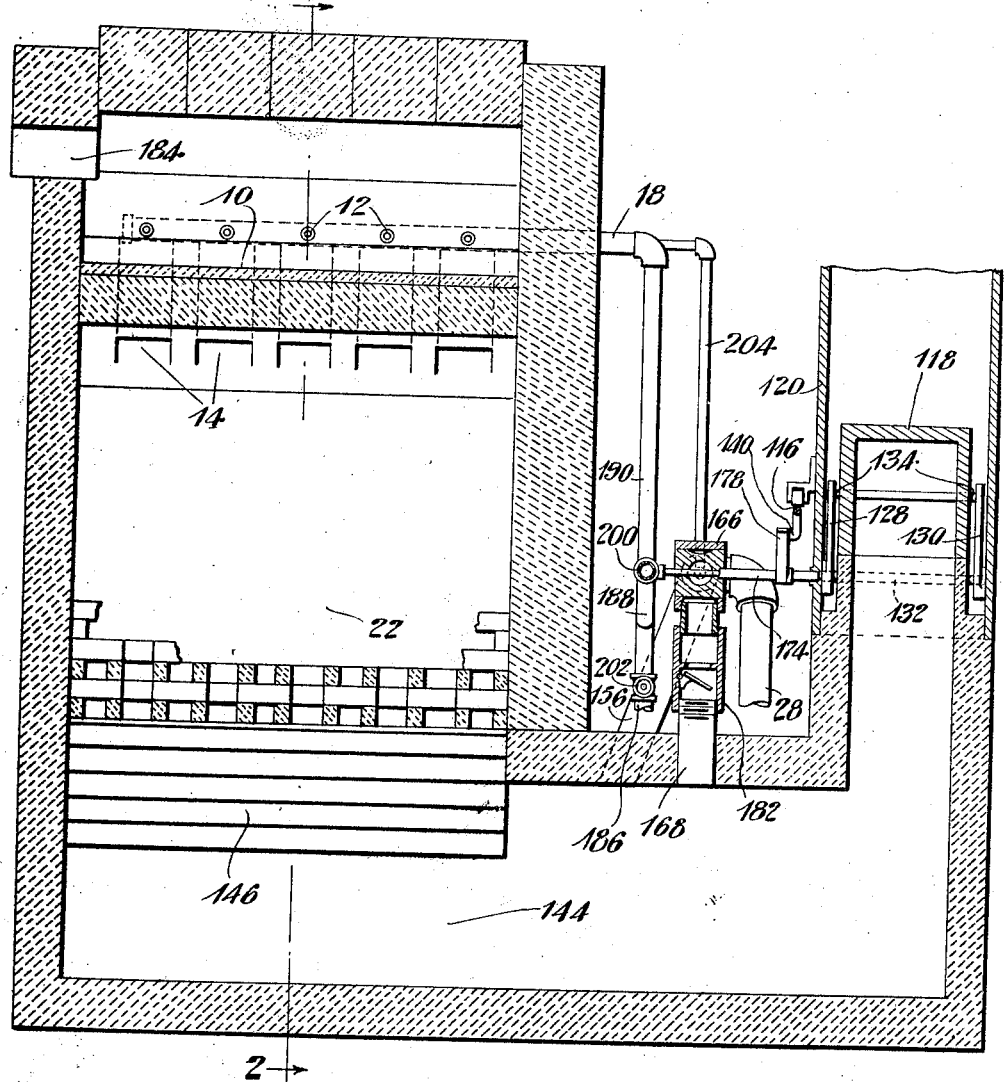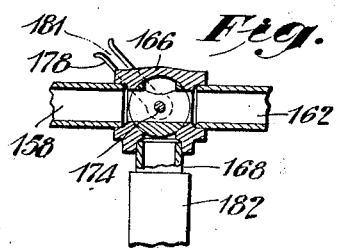

1,555,780

UNITED STATES PATENT OFFICE.

CARL J. WRIGHT, OF TOLEDO, OHIO.

GAS FURNACE.

Application filed September 5, 1919. Serial No. 321,760.

*To all whom it may concern:*

Be it known that I, CARL J. WRIGHT, a citizen of the United States, residing at Toledo, in the county of Lucas, State of Ohio, have invented certain new and useful Improvements in Gas Furnaces; and I do hereby declare the following to be a full, clear, and exact description of the invention, such as will enable others skilled in the art to which it appertains to make and use the same.

This invention relates to gas furnaces and more particularly to a method of and apparatus for controlling the temperature in gas fired regenerative furnaces.

In the employment of gas as a fuel for heating high temperature metallurgical and similar furnaces, it is necessary to preheat the air supplied to the furnace in order to obtain sufficiently high temperatures without using an excessively large amount of gas. Although the temperature may be increased in this manner, the heating systems at present in use do not provide an accurate control of the temperature of the furnace as a whole nor of the flame temperatures in different parts of the furnace. The temperature obtained in a furnace may be roughly controlled by controlling the rate of supply of fuel gas, but will depend more directly on the temperature of the preheated air supplied to the furnace and on the character of the flame produced in the furnace. Consequently, even with a constant supply of gas and air, the temperature of the furnace may vary at different times and the temperatures in different parts of the furnace may vary.

The primary object of the present invention is to provide a process of heating furnaces by which the temperature in the furnace may be accurately and automatically controlled.

A further object of the invention is to provide a regenerative heating apparatus for a furnace by which the furnace may be uniformly maintained at any desired temperature.

A further object of the invention is to provide a process and apparatus for heating an open hearth regenerative furnace by which the character of the flame may be controlled to obtain any desired temperature in the furnace while maintaining corresponding temperatures required in the regenerators.

With these and other objects in view, the invention consists in the process and apparatus for heating furnaces, hereinafter set forth in the following specification and defined in the claims.

The various features of the invention are shown in the accompanying drawings, in which:

Fig. 1 is a plan view in section, taken on line 1—1 of Fig. 2, of a regenerator furnace and temperature controlling apparatus embodying a preferred form of the invention.

Fig. 2 is a vertical section of the furnace, taken on the line 2—2 of Figs. 1 and 3.

Fig. 3 is a vertical section of one side of the furnace, taken on line 3—3 of Fig. 1.

Fig. 4 is a detailed view of a gas measuring device and a portion of the valve mechanism of the temperature controlling apparatus.

Fig. 5 is a detailed view in side elevation of the regenerator valve shifting apparatus.

Fig. 6 is a detailed sectional view of one of the gas burners, and

Fig. 7 is a detailed sectional view of a three-way valve for controlling the flow of gas to the furnace regenerators.

The particular furnace illustrated in the drawings is of the open hearth type in which iron or steel forgings may be heated continuously while some forgings are being placed on and others are being removed from the hearth. The forgings rest on a hearth 10 (Fig. 2) which is heated by the combustion of gas admitted to the furnace chamber through sets of burners 12 and inlet openings 14 and 16 positioned at opposite sides of the furnace.

The air for burning the gas introduced by the burners 12, is admitted through pipes 17 from an air main 18. The air for burning the gas introduced through the openings 14 and 16 flows through regenerators and passes up through the openings 14 and 16 after being mixed with the gas immediately below the openings. The gas entering through the inlets 14 and 16 is alternately heated in one of a pair of regenerators 19 and 20, and at the same time the other regenerator is being heated by hot combustion products leaving the hearth. Similarly the air for burning the gas is alternately heated in one of a pair of regenerators 22 and 24 while the other regenerator is being heated by hot combustion products leaving the hearth 10. The regenerating chambers are filled with loosely stacked fire brick or other material adapted to store heat. The supply of gas is admitted to the regenerators 19 and 20 and to the sets of burners 12 alternately, in accordance with the direction of flow of air for combustion through the regenerators 22 and 24 respectively, and reversal of the supply of gas to the burners 12 and the regenerators 19 and 20 is made at approximately the same time as the reversal of the supply of air to the regenerators 22 and 24. To secure any desired uniform temperature over the hearth, the reversal of the direction of flow of the gas and air is accomplished automatically in accordance with the quantity of gas burned. The flame temperature and the course of the flame over the hearth are also controlled by a secondary air supply which is admitted to the burners 12 through the pipes 17.

With a fixed rate of supply of air and gas, the temperature obtained in the furnace will be increased or decreased by a corresponding increase or decrease in the temperature of the air from the regenerators. In order, therefore, that the furnace may be kept at any desired constant temperature, it is necessary that the regenerators be kept at correspondingly even temperatures. This may be accomplished by burning equal quantities of fuel gas in the furnace during the intervals when the regenerators are heated by the waste products of combustion, since the combustion of equal quantities of gas will produce equal quantities of heat in the combustion gases which serve to heat the regenerators.

In the present invention the quantity of gas burned in the furnace during each regenerator heating interval is kept constant by stopping the passage of combustion gases through the regenerator being heated, and directing the gases to the other regenerator when a predetermined quantity of gas has been supplied to the furnace. In the following description and claims therefore, when gas is specified this may designate either the fuel gas which is to be burned, in case the surrounding context does not exclude such a construction, or the air supplied to support combustion.

The fuel gas, according to the preferred form of the invention, is passed through an orifice plate or partition which produces a pressure drop having a definite relation to the flow of gas through the orifice. Pitot tubes, Venturi tubes, or other gas measuring devices which develop pressure differences having a definite relation to the rate of flow of the gas may be used instead of the orifice plate. The pressures on opposite sides of the orifice plate are transmitted to a pressure operated valve which governs the flow of a liquid to a mechanism for controlling the flow of air to the regenerators. The pressure operated valve is so adjusted that the flow of fluid through the valve is directly proportional to the flow of gas through the orifice. The mechanism for controlling the flow of air to the regenerators thus is operated whenever a definite quantity of fluid has passed through the pressure operated valve. With this arrangement, also, the flow of air through the regenerators is controlled by the passage of a predetermined quantity of gas to the furnace.

Fuel gas for heating the hearth 10 (Figs. 1, 2 and 3) is supplied through a gas pipe 28 in a measured quantity and upon this measurement depends the operation of the gas and air reversing valves. The gas passing through pipe 28 flows through a standard orifice 30 in a plate 32 mounted transversely of the pipe 28. In passing through the orifice 30, the gas will undergo a drop in pressure which will have a definite ratio to the rate of flow of gas through the orifice. This drop or difference in pressure is transmitted to a diaphragm 34 in a diaphragm chamber 36 by means of a pipe 38 leading from the supply side of the orifice plate to the lower side of the diaphragm and a pipe 40 leading from the low pressure or delivery side of the orifice plate to the upper side of the diaphragm. The diaphragm 34 is pressed downwardly against the pressure transmitted by the pipe 38 by means of a spring 42 which projects up into an extension 44 on the diaphragm chamber 36. The spring 42 re-acts against a rod 46 which is held in place by means of a cap 48 on the extension 44. The cap 48 can be screwed down on the extension 44 so as to vary the pressure of the spring on the diaphragm 34 for any position of the diaphragm and accordingly to regulate the difference in gas pressure on the upper and under sides of the diaphragm required to raise the diaphragm to any desired position.

A valve rod 50 extends through the bottom of the diaphragm chamber 36 and is attached, at its upper end, to the diaphragm 34. The lower end of the valve rod 50 extends into a valve chamber 52 and carries a valve 54 governing the rate of flow of water or other liquid through a pipe 56, the arrangement of the parts being such that as the pressures induced on opposite sides of the orifice plate 32 cause the diaphragm 34 to be moved up or down, the valve 54 approaches its opened or closed position to keep the flow of liquid through the pipe 56 proportional to the flow of gas through the pipe 28. The liquid flowing past the valve 54 is delivered into a bucket 58 which automatically swings through an arc of 90° when a proper quantity of liquid accumulates therein. The swinging movement of the bucket operates a hydraulic valve which controls the movement of a piston for operating the gas and air reversing valves.

To this end, the bucket 58 is made up of two parallel side-walls 62 and 64 (Fig. 1) and two bottom walls 66 and 68 (Fig. 4). Offset portions, or depressions, 70 and 72 are provided respectively in the bottom walls 66 and 68, and openings 74 and 76 are formed in the depressions to provide drain outlets for the liquid accumulating in the bucket. A partition 78 extending from the junction of the bottom walls 66 and 68 to the centre of the bucket, divides the bucket into two compartments 80 and 82, and top walls 84 and 86 are mounted adjacent to the depressions 70 and 72 respectively, which act to hold the liquid in the compartments when the bucket swings about a horizontal rock shaft 88. The bucket is always held with one of the compartments in an elevated position by means of one or the other of latches 90 and 92 which are arranged to engage notches 94 formed in lugs 96 mounted adjacent the top walls 84 and 86. The water from pipe 56 is delivered to the bucket 58 directly over the shaft 88 and is directed to the compartment 80 or 82 which is uppermost, by means of the partition 78. As the water flows from the pipe 56 into the bucket compartment 82 (Fig. 4), it accumulates in the compartment until it raises a float 98 connected by a rod 100 to the latch 92. When the float 98 is raised by the buoyant effect of the water, it releases the latch 92 from the notch 94 and the bucket swings on the shaft 88 in the direction shown by the dotted arrows. The liquid will now flow out of the compartment 82 through the opening 76 in the well 72 and the liquid from the pipe 56 will be deflected into compartment 80 which is now held in an upright position by means of the latch 90. The latch 90 is connected by a rod 101 to a float 102 which operates in the same manner as the float 98.

When the bucket 58 swings after the accumulation of a predetermined quantity of water in one of the compartments, a valve is operated to reverse the direction of flow of a pressure fluid acting on the gas and air valve reversing mechanism. To accomplish this, the rock shaft 88 upon which the bucket is mounted is connected to a four-way valve 103 (Figs. 1 and 5). The valve 103 is associated at one side with a fluid pressure pipe 104 and at the other side to an exhaust pipe 106. In the position of the valve 103 shown in Fig. 5, the pipe 104 is put into communication with a pipe 108 which delivers the fluid under pressure to a cylinder 110 and against the right-hand side of a piston 112 mounted in the cylinder. The fluid under pressure acts to force the piston 112 to the left and to force the fluid on the left hand side of the piston 112 through a pipe 114 to the 4-way valve 103 from which it passes to the pipe 106. The swinging movement of the bucket 58 gives the valve 103 a quarter rotation. In this rotation the pipes 108 and 114 are in turn connected with the fluid pressure pipe 104 and correspondingly the pipe 114 or 108 will be connected with the exhaust pipe 106. The time required for moving the piston 112 throughout the length of the cylinder 110 is comparatively short as compared with the time required for filling a compartment of the bucket 58.

When the piston 112 is reciprocated by the fluid under pressure, a piston rod 116 attached to the piston 112 is actuated to operate the valves for directing the supply of air and gas to the regenerators. The valve for directing the flow of air to the regenerators may be of any desired type. That shown in the accompanying drawings is a hollow box-like valve 118 adapted to slide back and forth within a valve chamber 120 and to cover at one time a central air inlet port 122 and one or the other of exhaust gas ports 124 and 126. Valve 118 is moved by the reciprocation of the piston rod 116. To accomplish this, arms 128 and 130 (Figs. 1, 3 and 5) are fixed at their lower ends to a shaft 132 rotatably mounted in and extending through the valve chamber 120 and the upper ends of the arms are provided with slots which engage pins 134 projecting from the sides of the valve. An arm 136 is fixed on the outer end of the shaft 132 and has a slot 138 at its upper end, which is arranged to engage a pin 140 mounted on the piston rod 116. With this construction, as the piston rod 116 is moved back and forth, it rotates the shaft 132 by means of the crank arm 136 and shifts the valve 118 to alternately cover the ports 122 and 126 and the ports 122 and 124.

A regulated supply of air is forced by a blower 142 through the port 122 and under the valve 118 and flows either into the port 124 or the port 126 according to the position of the valve 118. In the position of the valve shown in Figs 1 and 5, the air entering through the port 122 will be directed to the port 124. The air flowing through the port 124 will then enter a flue 144 positioned under the furnace hearth as shown in Figs. 1, 2 and 3. From the flue 144, the air will flow through an opening 146 into the heated checkerwork of regenerator 22 and will be heated by contact with the hot checkerwork. From the regenerator 22 the heated air will pass through an opening 148 to the upper part of the regenerator 19 where it meets fuel gas and passes through the opening 14 to the hearth 10. The burning gas and air then pass over the furnace hearth 10 and heated products of combustion leave through openings 16 on the other side of the hearth. After passing through openings 16, the hot products of combustion divide (Fig. 2) and part of them passes directly to the gas heating regenerator 20 and the remainder passes thru the opening 150 to the air heating regenerator 24. As the heated products of combustion pass through the regenerators 20 and 24 they give up a part of their heat and serve to heat the regenerator checkerbrick. From the regenerator 24 the gases then pass into a flue 152 leading to the port 126 from which the waste gases are exhausted to the atmosphere. The hot gases from the regenerator 20 pass into a flue 154 which communicates with the flue 152 (Fig. 1) through a valve device to be hereinafter described.

When the valve 118 is shifted through the action of the piston rod 116 so as to cover the ports 122 and 126, the air entering through the port 122 is directed by the valve 118 through the port 126 to the flue 152. From the flue 152 the air passes to the regenerator 24 where it is heated before passing to the furnace hearth 10. The hot products of combustion from the hearth 10, pass through the opening 14, divide, and enter the regenerators 19 and 22. After passing through the regenerator 22, the gases enter the flue 144 and pass to the port 124 from which they exhaust to the atmosphere. The gases from the regenerator 19 pass to the flue 156 connected through a gas control valve to the flue 144. The regenerator chambers are preferably of such size that hot products of combustion will be substantially cool when exhausted, and the incoming air will be preheated to substantially the temperature of the combustion products entering the regenerator chamber. After being measured in passing through the orifice plate, the gas flows through the pipe 28 to a T 158 which is connected with branch pipes 160 and 162 leading respectively to the flues 156 and 154 and the regenerators 19 and 20. Three-way valves 164 and 166 mounted in the pipes 160 and 162 are arranged to put the pipes 160 and 162 alternately into communication with the T 158 and into communication with by-pass pipes 168 and 170 leading from the valves 164 and 166 to the flues 152 and 144 respectively. To this end, valve stems 172 and 174 extending from the valves 164 and 166 are connected with crank arms 176 and 178 which are provided with slots 180 and 181 arranged to be engaged by the pin 140 on the piston rod 116. As the piston rod 116 is shifted back and forth it successively gives the crank arms 176 and 178 and the valve stems 172 and 174 a quarter turn so as to first close the passage from the T 158 to one of the pipes 160 or 162 and then open the passage from the T 158 to the other of the pipes 160 and 162. By thus first shutting off the supply of gas from the T 158 to one of the pipes 160 or 162, the fuel gas contained in the pipe 160, flue 156 and regenerator 19, or in the pipe 162, flue 154 and regenerator 20, is allowed to pass into the furnace and be consumed before the direction of the flow of gases is reversed. Upon such reversal of the flow of the gases, the by-pass pipe 170 or 168 allows the products of combustion entering gas regenerators 19 or 20 to pass through flue 156, pipe 160, or flue 154 and pipe 162, as the case may be, into the air flue 144 or 152.

In the absence of means to prevent it, during the interval between shutting off the flow of gas from the pipe 28 by valve 164 or 166 and the shifting of the valve 118, air from the flues 144 or 152 might pass through the branch pipe 170 or 168 and pipe 160 or 162 to the gas regenerators 19 or 20 and mix with the gas contained therein. To prevent this mixing of the gases and eliminate the consequent danger of explosion, check valves 182 and 183 are provided in the branch pipes 168 and 170 respectively. The check valves 182 and 183 are arranged to open downwardly and to be closed by the upward passage of gas through the branch pipes 168 and 170 and to thus prevent at all times the possibility of air passing from the flues 144 or 152 to the gas regenerators 19 or 20.

The air supplied to the furnace is placed under a positive pressure produced by the blower 142 and passed through the port 122 and the regenerators 22 and 24 with a small drop in pressure. As the air enters the combustion chamber above the hearth, it is still under a pressure slightly higher than that of the atmosphere. There is a tendency, therefore, for a part of the combustion gases to pass out of the furnace directly to the atmosphere through an opening 184 provided in the front of the hearth chamber for introduction and removal of the articles to be treated. There is a consequent loss of heat from the front of the hearth chamber, causing an unevenness in the heating of the furnace. The loss of hot combustion gases from the opening 184 also interferes with the heating of the regenerators and makes it difficult for the workmen to approach the opening 184.

In order to prevent this escape of the hot combustion gases through the opening 184, the course of the flame is controlled to carry it directly across the furnace chamber and to direct it to any desired portion of the hearth. For this purpose a secondary supply of air under pressure is alternately admitted to opposite sides of the furnace through the nozzles or burners 12 and directed in horizontal blasts over the hearth 10. This supply of air enters the hearth chamber with a high velocity and controls the flame in the same manner in which a flame is controlled by a blow pipe. Secondary air for the burners 12 is supplied through a pipe 186 (Figs. 3 and 5) mounted between the furnace and the valve shifting chamber. From the pipe 186 the air flows through a T 188 either to a pipe 190 or to a pipe 192 which lead to opposite sides of the furnace and are connected with pipes 18 leading to the burner pipes 17. Valves 198 and 200 arranged similarly to the valves 164 and 166 in the gas supply pipe are mounted in the pipes 190 and 192. The valve stems of the valves 198 and 200 extend from the valves 164 and 166 and are connected to the valve stems 172 and 174 respectively. With this construction, the valves 198 and 200 will be operated at the same time that the gas valves 164 and 166 are operated. The amount and pressure of the air supplied is controlled by means of a valve 202 in the supply pipe 186. By varying the pressure and volume of the secondary supply of air, the velocity of the gases across the chamber may be controlled and the flame may be shortened or contracted in much the same manner as the flame of a blast lamp may be contracted. In this manner the temperature throughout the furnace may be controlled within certain limits independently of the fuel supply or the temperatures in the regenerators. By varying both the fuel supply and the additional air supply, the flame may be varied so that within certain limits any amount of fuel may be burned in any desired space thereby permitting a greater latitude of regulation to be obtained than is possible in the ordinary regenerative furnace.

In order more thoroughly to mix the fuel gas with the blast from the burners 12, and to obtain a more even combustion in the furnace, a portion of the fuel gas may be led from the supply pipes 160 or 162 to the burners 12 through pipes 204 and 206 and branch pipes 208 and 210. The amount of gas admitted through the pipes 204 and 206 may be regulated by valves 212 and 214.

The operation of the entire apparatus is briefly as follows: Fuel gas passing through the orifice 30 in the pipe 28 controls the rate of flow of liquid through the pipe 56 by means of the diaphragm valve 54 so that the flow of liquid in the pipe 56 is proportional to the flow of gas through the orifice 30. When sufficient liquid has passed to one of the compartments 80 or 82 of the bucket 58 one of the latches 90 or 92 releases the bucket and the bucket swings, rotating the rock shaft 88 through a quarter revolution. The bucket 58 in this way through the shaft 88 alternately gives the four-way valve 103 a turn in opposite directions to deliver fluid under pressure to one end or the other of the cylinder 110 and thereby move the piston rod 116 to the right or left. The back and forth movement of the piston rod 116 successively rotates the crank arms 136, 176 and 178 and the shaft 132 and valve stems 172 and 174 a quarter of a turn. Thru the mechanism described above, the shaft 132 shifts the slide valve 118 to connect the port 122 with either port 124 or the port 126 and at the same time the valve stems 172 and 174 serve to simultaneously open the valves 164 and 198 and close the valves 166 and 200, or to close the valves 164 and 198 and open the valves 166 and 200. In this way both the gas from the pipe 28 and the air under pressure from the pipe 186 are conducted to that side of the furnace through which the air enters from the regenerators. By varying the position of the cap 48 on the extension 44 of the diaphragm chamber, the ratio of the rate of flow of gas in the pipe 28 to the flow of liquid through the pipe 56 may be varied and the amount of gas supplied to the furnace in each interval may be accordingly varied.

As mentioned above the orifice may be placed in the air supply pipe of the furnace and other types of flow measuring devices may be employed. The valve shifting means may also be operated by other motive power than fluid under pressure as described in the above specification. These and other similar changes in the mechanical arrangements of the furnace may be made without departing from the spirit of the invention. In the above specification it has been stated that the valve shifting mechanism is operated by the passage of equal amounts of gas through the pipe 28.

In case the regenerators 19 and 22 and 20 and 24 respectively do not have the same heat absorbing capacity and that one set of regenerators may require a greater amount of heat than is necessary to heat the other set of regenerators, the bucket compartments 80 and 82 or the floats 98 and 102 may be adjusted so that the four-way valve will be operated at slightly unequal times. In such a case the regenerative heating effects of the gas burned will be equal and the term "equal" is used in this specification and claims rather in the sense of its heating equality than in the sense of the exact mathematical equality of the gas burned.

It is advantageous to preheat the fuel gas as described above when a large quantity of gas of low heating value is to be employed. When a comparatively smaller quantity of gas of high heating value is used, the regenerators 19 and 20 may be omitted and all of the fuel gas passed directly to the burners 12.

Having thus described the preferred form of the invention, what is claimed as new is:

1. A process of operating a gas fired regenerative furnace, comprising passing air and fuel gas through heat storage elements to said furnace, exhausting the products of combustion through a second set of heat storage elements, reversing the direction of flow of the air and gas through the heat storage elements, causing the heat storage elements alternately to absorb heat from the combustion gases and impart heat to the entering air and gas, and varying the interval of time between each reversal inversely to the rate of supply of gas.

2. A process of operating a gas fired regenerative furnace, comprising passing air and gas through heat storage elements to said furnace, exhausting the products of combustion through a second set of heat storage elements, supplying additional air under pressure to that side of the furnace to which the air passes from the regenerators, reversing the direction of flow of said air and gas thru a heat storage element, changing the supply of additional air to that side of the furnace to which the air and gas come from the regenerators, and varying the intervals of time between each reversal inversely to the rate of supply of gas.

3. A process of operating a gas fired regenerative furnace, comprising passing air and fuel gas through heat storage elements to said furnace, exhausting the products of combustion through a second set of heat storage elements, reversing the direction of flow of the air and gas through the furnace and heat storage elements, varying the interval of time between each reversal inversely to the rate of supply of gas, and adjusting the relative lengths of time between alternate reversals to obtain the desired heating effects in each set of regenerators.

4. A process of operating a gas fired regenerative furnace which comprises passing air and fuel gas through heat storage elements to said furnace, exhausting the products of combustion through a second heat storage element, reversing the flow of air and gas through the furnace and heat storage elements, varying the interval of time between each reversal inversely to the rate of supply of gas and varying the quantity of gas supplied to said furnace during the intervals between the reversals of the flow of gas through said furnace.

5. A process of operating a gas fired regenerative furnace, comprising passing air through heat storage elements to said furnace, exhausting the products of combustion through a second set of heat storage elements, successively shutting off the supply of gas to one side of the furnace, shifting the supply of air from the regenerator on that side of said furnace to the regenerator on the opposite side of said furnace, and opening the supply of gas on the opposite side of said furnace, and varying the intervals of time between each reversal of direction of flow of said gases to said furnace.

6. In a gas-fired regenerative furnace, air and gas regenerators, one of each associated with each end of the furnace, a flue for each air regenerator for leading air thereto when the flow is toward the furnace, a main gas line supply pipe, branch gas supply pipes for conducting gas from the main supply pipe to the gas regenerators, a by-pass pipe between each of said branch pipes and the flue of the corresponding air regenerator, means for reversing the direction of flow of air and gas to the regenerators and flues, said means being connected into the gas supply immediate said main and said branch pipes, and check valves in said by-pass pipes whereby air from an air flue is prevented from passing to a branch gas pipe through said by-pass pipes but permitting products of combustion from the furnace and gas regenerators to pass through said by-pass pipes to said air flues.

7. In a gas fired regenerative furnace having a pair of heat regenerators and gas supplying means, the combination of a reversing valve for reversing the flow of air through the regenerators and furnace, a fluid actuated means for operating the reversing valve, a four-way valve for controlling the supply of fluid to said means, a rock shaft connected to said four-way valve, a tilting bucket operatively connected to said rock shaft and having compartments arranged to be alternately depressed in opposite directions by the weight of a liquid accumulated in said compartment, a liquid supply pipe for feeding liquid into the uppermost of said compartments, a valve in said supply pipe governing the supply of liquid to said bucket, a diaphragm governing the liquid supply valve, an orifice plate in said gas supply pipe, and means for transmitting the pressure from opposite sides of said orifice plate to opposite sides of said diaphragm to vary the opening of said liquid supply valve as the flow of gas through said orifice varies.

8. In a gas fired regenerative furnace having a pair of heat regenerators and gas supplying means, the combination of means for reversing the flow of air through the regenerators and furnace, means for controlling the application of power to said reversing means, a rock shaft connected to said controlling means, a tilting bucket operatively connected to said rock shaft and arranged to be alternately rocked in opposite directions by the weight of a liquid accumulated in said bucket, a pipe for supplying liquid to said bucket, a valve in said supply pipe governing the supply of liquid to said bucket, a diaphragm governing the liquid supply valve, an orifice plate in said gas supply pipe and means for transmitting pressure from opposite sides of said orifice plate to opposite sides of said diaphragm to vary the opening of said liquid supply valve as the flow of gas through said orifice varies.

9. In a gas fired regenerative furnace having a pair of heat regenerators and gas supplying means, the combination of means for reversing the flow of air through the regenerators and furnace, means actuated by the accumulation of a liquid for controlling the air reversing means, a valve governing the supply of liquid to said controlling means, a diaphragm governing the liquid supply valve, an orifice plate in said gas supply pipe, and means for transmitting pressure from opposite sides of said orifice plate to opposite sides of said diaphragm to vary the opening of said liquid supply valve as the flow of gas through said orifice varies.

10. In a gas fired regenerative furnace having a pair of heat regenerators and gas supplying means, the combination of means for reversing the flow of air through the regenerators and furnace, means actuated by the accumulation of a fluid for controlling the air reversing means, and a pressure operated valve governed by the flow of gas to the furnace for controlling the accumulation of said fluid.

11. In a gas fired regenerative furnace having a pair of heat regenerators and gas supplying means, the combination of means for reversing the flow of air through the regenerators and furnace, means actuated by the accumulation of a fluid for controlling the air reversing means, and means governed by the flow of gas to the furnace for controlling the accumulation of said fluid.

12. In a gas fired regenerative furnace having a pair of heat regenerators and gas supplying means, the combination of a valve for reversing the flow of air through the regenerators and furnace, power actuated means for shifting the reversing valve, means for controlling the application of power to said valve shifting means, a rock shaft connected to said controlling means, a tilting bucket operatively connected to said rock shaft and having compartments arranged to be alternately depressed by the weight of a liquid accumulated in said compartments, a liquid supply pipe for feeding liquid into the uppermost of said bucket compartments, a valve in said supply pipe governing the rate of supply of liquid to said bucket, a diaphragm governing the liquid supply valve, an orifice plate in said gas supply pipe, and means for transmitting the pressure from opposite sides of said orifice plate to opposite sides of said diaphragm to vary the opening of said liquid supply valve as the flow of gas through said orifice varies.

13. In a gas fired regenerative furnace having a pair of heat regenerators and gas supplying means, the combination of means for reversing the flow of air through the regenerators and furnace, means actuated by the accumulation of a fluid for controlling the air reversing means, and a diaphragm valve governed by the flow of gas to the furnace for controlling the accumulation of said fluid.

14. In a gas fired regenerative furnace, having sets of heat regenerators and gas supplying means, the combination of means for developing a difference in pressure having a definite relation to the rate of flow of gas to said furnace, means controlled by the accumulation of a fluid for reversing the flow of air and gases through said regenerators and furnace, and means governed by the difference in pressure developed by the flow of gas for controlling the rate of accumulation of said fluid.

15. In a gas fired regenerative furnace, having a pair of heat regenerators and gas supplying means, the combination of means for developing a difference in pressure having a definite relation to the flow of gas to the furnace, and means governed by said difference in pressure for reversing the flow of air through said regenerators and furnace.

16. In a gas fired regenerative furnace, having a pair of air regenerators and gas supplying means, the combination of means for developing a difference in pressure having a definite relation to the flow of gas to the furnace, means for reversing the direction of flow of air through said regenerators and furnace at intervals of time, and means controlled by said difference in pressure for controlling the length of said intervals of time.

17. In a gas fired regenerative furnace, having a pair of heat regenerators and a series of gas burners on each side of the furnace, the combination of means for reversing the flow of air through the regenerators and furnace, means for supplying gas to the set of burners on the side of the furnace to which the heated air comes from the regenerators, means for developing a difference in pressure having a definite relation to the flow of gas to the furnace and means controlled by said difference in pressure for controlling said reversing means.

18. In a gas fired regenerative furnace having a pair of heat regenerators and a series of burners on each side of the furnace, the combination of means for reversing the flow of air through the regenerators and furnace and for alternately supplying gas and air under pressure to that set of burners on the side of the furnace to which the heated air comes from the regenerator, means for developing a difference in pressure having a definite relation to the flow of gas to the furnace and means governed by said difference in pressure for controlling said reversing means and said gas and air supply means.

19. In a gas fired regenerative furnace, comprising a set of regenerators for preheating air and gas supplied to said furnace, a second set of air and gas regenerators, an air supply control valve arranged alternately to supply air to one of said air heating regenerators and withdraw waste gases from the other of said regenerators, a fuel gas supply pipe, valves in said pipe arranged alternately to supply gas to one of said gas regenerators and withdraw hot gases from the other of said regenerators, burner nozzles on opposite sides of said furnace, an additional air supply pipe connected to said burner nozzles, valves in said air supply pipe arranged alternately to open the supply of air to the burners on the side of said furnace to which air and gas are supplied and close the supply of air to the other side of said furnace, and means governed by the passage of gas to said furnace for successively closing the gas and additional air supply valves at one side of said furnace, shifting said air supply control valve, and opening the gas and additional air supply valves at the other side of said furnace.

20. In a gas fired regenerative furnace comprising gas heating regenerators and air heating regenerators, the combination of flues communicating with said regenerators, outlets from said regenerators in which air and gas commingle prior to ignition, a valve adapted to control the supply of air to and removal of products of combustion from said air heating regenerators through said flues, a gas supply pipe, branch pipes leading from said gas supply pipe to said gas heating regenerators, of valves in the gas supply pipe arranged to connect the branch gas pipes to the gas supply pipe, burner nozzles on opposite sides of said furnace arranged to deliver flame into the commingled air and gas from said outlets, a compressed air supply pipe, branch pipes from said compressed air supply pipe to said burner nozzles, gas pipes from said branch gas pipes to said burner nozzles, valves in said branch air pipes operable to open and close said branch air pipes, and means for alternately and successively closing the valve in the branch air pipe on one side of the furnace and operating the gas supply valve on that side of the furnace to sever communication between the corresponding branch gas pipe and the main gas supply pipe, shifting the air control valve to reverse the direction of the flow of air through the regenerators and flues, and opening the valve in the branch air pipe on the other side of the furnace and operating the gas supply valve on that side of the furnace to establish communication between the other branch gas pipe and the main gas supply pipe.

21. In a gas fired regenerative furnace having sets of air heating regenerators and gas heating regenerators, the combination of flues communicating with the air heating regenerators, a valve adapted to control the supply of air to and removal of products of combustion from the air heating regenerators through said flues, a gas supply pipe, branch pipes leading from said gas supply pipe to said gas heating regenerators, by-pass pipes from said branch pipes to said flues, valves arranged to connect said branch pipes either to the gas supply pipe or the adjacent by-pass pipe, and means for successively operating one of said gas supply valves to sever communication between a branch gas pipe and the main supply pipe and to establish communication between the branch gas pipe and the by-pass pipe, shifting the air control valve to reverse the flow of air and gas through the regenerators, and operating the other of said gas supply valves to establish communication between the other branch gas pipe and the main supply pipe and to sever communication between said branch pipe and the adjacent by-pass pipe.

22. In a gas fired regenerative furnace having sets of heat regenerators and gas supplying means, the combination of means for developing a difference in pressure having a definite relation to the rate of flow of gas to said furnace, means controlled by the accumulation of a fluid for reversing the flow of gases through said regenerators and furnace, means governed by the difference in pressure developed by the flow of gas for controlling the rate of accumulation of said fluid, and means for varying the ratio of the rate of the accumulation of said fluid to said pressure difference.

23. In a gas fired regenerative furnace having a pair of heat regenerators and gas supplying means, the combination of means actuated by fluid under pressure for reversing the flow of air through the regenerators and furnace, means actuated by the accumulation of a liquid for controlling the air reversing means, a liquid supply pipe, a valve in said supply pipe governing the supply of liquid to said controlling means, a diaphragm governing the liquid supply valve, a partition in said gas supply pipe provided with an orifice, means for transmitting pressure developed at opposite sides of said orifice to opposite sides of said diaphragm to vary the opening of said liquid supply valve as the flow of gas through said orifice varies, and means for exerting an adjustable pressure on the low pressure side of said diaphragm.

24. A gas fired regenerative furnace, comprising a set of regenerators for preheating air and gas supplied to said furnace, a second set of air and gas regenerators, an air supply control valve arranged alternately to supply air to one of said air heating regenerators and withdraw hot gases from the other of said regenerators, a fuel gas supply pipe, valves in said gas supply pipe adapted alternately to supply gas to one of said gas regenerators and withdraw hot gases from the other of said gas regenerators and an auxiliary pipe governed by the passage of gas to said furnace for successively closing the supply of gas to one regenerator, shifting said air supply control valve, and opening the supply of gas to the other of said regenerators.

25. A gas fired regenerative furnace, comprising a set of regenerators for preheating air and gas supplied to said furnace, a second set of air and gas regenerators, an air supply control valve arranged alternately to supply air to one of said regenerators and withdraw hot gases from the other of said regenerators, a fuel gas supply pipe, valves in said gas supply pipe adapted alternately to supply gas to one of said regenerators and withdraw hot gases from the other of said regenerators, means for supplying air under pressure to either side of said furnace, valves in said auxiliary air supply pipe adapted to alternately supply air to that side of the furnace to which fuel gas is supplied through said regenerators and means governed by the passage of gas to said furnace for successively closing the supply of gas to one regenerator and of air to the corresponding side of the furnace, shifting the air supply control valve and opening the supply of gas to the other of said regenerators and of additional air to the corresponding side of the furnace.

26. In a gas fired regenerative furnace, a hearth, air and gas regenerators arranged to conduct a mixture of air and gas to the ends of the hearth, means for periodically reversing the direction of flow of air and gas through the regenerators to cause gas to be ignited alternately at the ends of the hearth, and means at each end of the furnace for directing a blast flame into said mixture of air and gas.

27. In a gas fired regenerative furnace, a hearth having its ends spaced from the walls of the furnace, air and gas regenerators associated with each end of the hearth and arranged to conduct a mixture of gas and air to the ends of the hearth, means for reversing the direction of flow of air and gas through the regenerators to cause gas to be burned alternately at the ends of the hearth, auxiliary air and gas supply pipes in said furnace adjacent to the ends of the hearth, means to supply air and gas to said auxiliary pipes independently of the air passing through the regenerators, and means for causing flow of air and gas through the pipes at each end of the hearth when gas is being burned at that end to direct the flame of the burning gas over the hearth.

28. In a gas fired regenerative furnace, a hearth having its ends spaced from the walls of the furnace, air and gas regenerators associated with each end of the hearth, outlets from said regenerators in which the air and gas commingle, means for reversing the direction of flow of air and gas through the regenerators to cause gas to be burned alternately at the ends of the hearth, pressure blast gas burners adjacent to the ends of the hearth in which air and gas commingle, means for supplying gas and air to said burners independently of the air passing through the regenerators, and means for controlling the supply of air and gas to the blast burners arranged to maintain a blast from the end of the hearth at which the air and gas is introduced from the regenerators.

29. In a gas fired regenerative furnace, air and gas regenerators on each side of the furnace, flues communicating with the air regenerators, a main gas supply pipe, branch gas supply pipes for conducting gas from the main supply pipe to the gas regenerators, by-pass pipes between each of the branch pipes and the flue of the corresponding air regenerator, means for alternately shutting off the supply of gas to one of the branch pipes from the main gas supply pipe and establishing fluid connection between the branch pipe and the corresponding by-pass pipe to permit hot gases to flow from the gas regenerator through the by-pass pipe to the air flue, reversing the direction of flow of air and gas through the regenerators and flues, and establishing fluid connection between the main gas supply pipe and the branch pipe on the other side of the furnace, and check valves in the by-pass pipes for preventing the passage of air from an air flue to a branch gas pipe after the supply of gas to the branch pipe has been stopped and before the direction of flow of the air has been reversed.

30. In a gas fired regenerative furnace, air and gas regenerators on each side of the furnace, flues communicating with the air regenerators, means for supplying gas to the gas regenerators, means for reversing the direction of flow of air and gas to the regenerators and flues, and connections between the gas supply means and the flues constructed and arranged to allow products of combustion to pass from the gas regenerators to the air flues and to prevent the access of air from the air flues to the gas regenerators except by passing through the furnace.

In testimony whereof I affix my signature.

CARL J. WRIGHT.